Sept. 14, 1937.  R. J. JENNINGS  2,093,013
EGG COOKER
Filed Jan. 26, 1937

INVENTOR.
R. J. JENNINGS, INVENTOR, DECEASED.
BY ANN G. JENNINGS, ADMINISTRATRIX.
Boyken & Mohler
ATTORNEYS.

Patented Sept. 14, 1937

2,093,013

UNITED STATES PATENT OFFICE 2,093,013

EGG COOKER

Robert J. Jennings, deceased, late of San Francisco, Calif., by Ann G. Jennings, administratrix, San Francisco, Calif.

Application January 26, 1937, Serial No. 122,384

12 Claims. (Cl. 53—1)

This application is a continuation in part of co-pending application Serial No. 61,109, filed January 27, 1936.

This invention relates to new and useful improvements in egg cookers and has for one of its important objects to provide, in a manner as hereinafter set forth, a novel construction and arrangement whereby eggs may be cooked through the medium of steam generated in the device.

Another very important object of the invention is to provide a device of the character described embodying a novel construction, combination and arrangement of parts through the medium of which the eggs will be subjected to the action of steam for a predetermined length of time, depending on how much water to be converted into steam is placed in the device.

Still another very important object of the invention is to provide an egg cooker of the aforementioned character which will keep the eggs warm without further cooking for a considerable length of time after the steaming operation has been completed.

Other objects of the invention are to provide an egg cooker of the character set forth which will be comparatively simple in construction, strong, durable, highly efficient and reliable in use, compact, light in weight, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
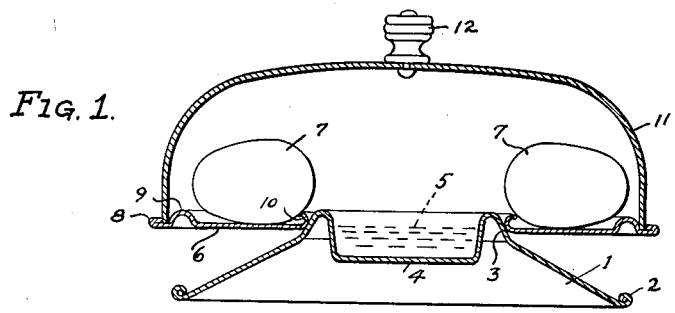
Figure 1 is a view in vertical section through an egg cooker constructed in accordance with the present invention.
Figure 2:
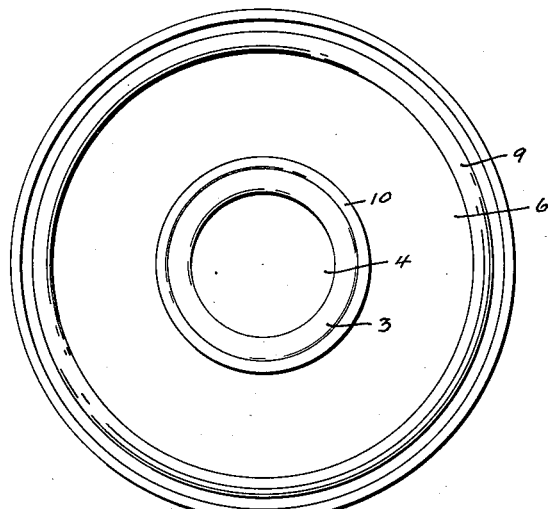
Figure 2 is a view in top plan of the invention, the cover being omitted.

Referring now to the drawing in detail, it will be seen that the embodiment of the invention which has been illustrated in Figures 1 and 2 comprises a substantially conical base 1 of any suitable metal which is provided, on its periphery, with a bead 2. Rising from the base 1 is a substantially tapered neck 3 having formed therein an integral well 4 for the reception of water to the desired level, as at 5.

Removably mounted on the tapered neck 3 of the base 1 is an annular tray or platform 6 on which the eggs 7 are mounted. On its outer periphery, the annular platform 6 is provided with a bead 8 and spaced inwardly therefrom is an upwardly pressed rib 9. On its inner periphery the annular platform 6 is provided with an upturned arcuate flange 10 which seats on the tapered neck 3. The eggs 7 are confined between the flange 10 and the rib 9 on the platform 6, as illustrated to advantage in Figure 1 of the drawing.

The reference numeral 11 designates a substantially dome-shaped cover which is removably mounted on the platform 6 over the eggs 7. The cover 11 engages the platforms 6 between the rib 9 and the bead 8, the latter preventing said cover from slipping on the platform. The cover 11 is provided with a centrally located handle 12. The cover 11, also the platform 6, are of any suitable metal.

In use, a desired quantity of water is placed in the well 4 and the base 2 is mounted over a flame, such as from the burner of a gas range. The eggs 7 are then mounted on the platform 6 and the cover 11 is placed in position thereover. As the water 5 comes to a boil the steam thus generated engulfs and cooks the eggs 7 in a manner which is thought to be obvious. The eggs are subjected to the action of the steam until the water 5 boils away and it will thus be seen that by varying the quantity of water placed in the well 4 the length of time that the eggs will be cooked may be controlled as desired. After the cooking operation has been completed the eggs will be kept warm for a considerable length of time beneath the cover 11. The substantially conical base 1 protects the platform 6 from the action of the flame and directs said flame inwardly against the bottom and walls of the well 4.

Figure 3:
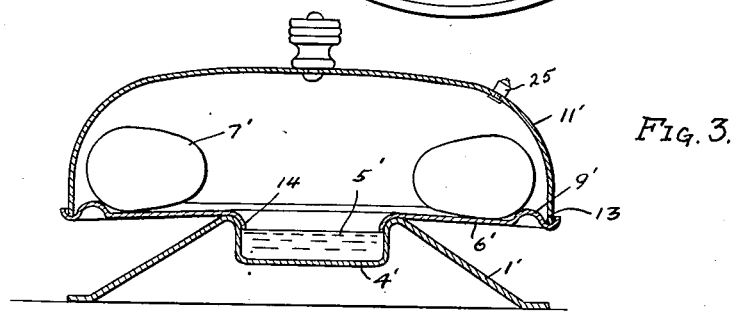
Figure 3 is a vertical sectional view through a slightly modified form of egg cooker.

In the form illustrated in Figure 3, the sides of the conical base 1' extends substantially straight to the upper edges of the sides of the upwardly opening centrally positioned well 4', which well is formed integrally with the base and is adapted to hold the water 5' therein.

The platform 6' (Figure 3) is annular in shape and is formed with an annular, upwardly projecting rib 9' at its peripheral margin, but spaced slightly inwardly of the peripheral edge of the platform, and the portion between the rib and peripheral edge is formed to U-shape in cross section as indicated at 13, for receiving the lower edges of the bell shaped cover 11'. Thus the channel 13 positions, or aligns the cover over the platform and well, and likewise functions to catch any moisture of condensation that may drain from the inner surface of the cover.

The inner marginal portion of the platform 6' around the central opening therein is turned downwardly to form a downwardly directed flange 14, which flange is adapted to removably fit within the well adjacent the upper edges thereof for positioning and supporting the platform elevated above the base 1'.

That portion of platform 6' that extends between the flange 14 and rib 9' is inclined slightly downwardly in the direction toward the rib, thus giving the platform a dished shape, so that the eggs 7' supported thereon will tend to roll toward and against the rib 9' only, and therefore will not accidentally roll into the well, although it is to be seen that the well could be covered by a perforated plate, or screen, or instead of cutting the central opening in the platform the platform could be centrally perforated instead. However, by providing the large central opening there is an unobstructed escape for the steam from the well to the space around the eggs.

Figure 4:
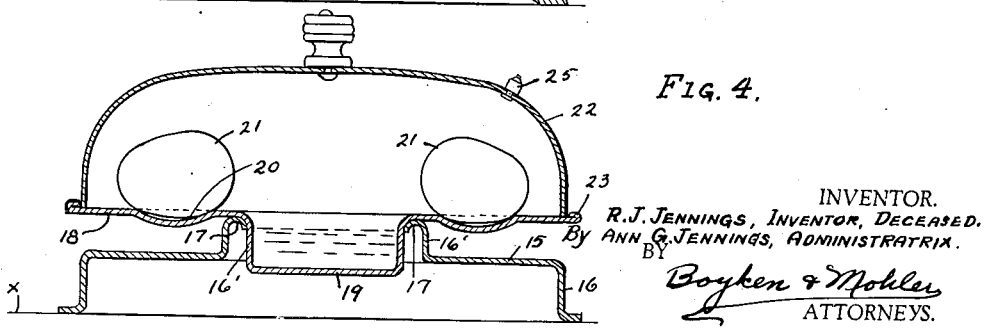
Figure 4 is a vertical sectional view through a still further form of egg cooker.

In the form of device illustrated in Figure 4, I show a horizontal circular base plate 15 having a downwardly directed flange 16 depending from its peripheral edges for supporting the plate 15 above the upper surface X of a stove, which plate is formed with a central, circular opening therein, having a flange 16' extending upwardly from the edges thereof, the upper edges of the flange being turned radially inwardly as at 17.

In this form of device, the egg supporting platform comprises a horizontal, circular plate 18 formed centrally with a liquid receiving well 19 integral therewith. The side walls of the well are cylindrical, and of a diameter slightly smaller than the diameter of the cylindrical flange 16', thus the well is adapted to extend through the central opening in the base plate 15 with the flange 16' spaced from the sides of the well, the inwardly turned edges 17 of the flange aligning the well within the flange with the flange supporting the plate 18 at the upper end of the well.

The plate 18, outwardly of the well, is formed with an annular row of shallow depressions 20 therein, each adapted to support an egg 21 therein on its side against accidental rolling into the well, or outwardly over the edge of the platform. A cover 22, similar to the covers in the other forms of the device, is adapted to be removably supported on the plate 18 outwardly of the row of depressions 20, and a bead 23 may be formed at the peripheral edge of the plate 18 for positioning the cover against lateral displacement relative to the plate.

It will be seen that in each of the above described several devices, there is a central well for the water, which well is spaced by a supporting base above the supporting surface of a stove, and the egg supporting platform is around the well and is insulated from the heat of the flame by the air between the supporting base and the egg supporting platform. Thus the eggs are substantially removed from the direct influence of heat from the flame, and the steam generated from the water in the central well is the effective egg cooking medium.

The spacing of the well above the stove functions to remove the bottom of the well a sufficient distance from the flame to substantially prevent any damage to the well in case the heat is not turned off after the water in the well has been converted into steam.

In all of the forms of the device, I may provide a small, conventional, steam whistle, in the cover, such as indicated at 25 in Figures 3 and 4, which whistle allows the escape of a very small amount of steam under pressure and operates the whistle to give an audible signal, so that when the water in the well has all been converted into steam, the signal will cease to operate and the operator will be informed that the eggs are cooked and can turn off the heat.

The well is adapted to contain at least three teaspoonfuls of water, and the platform is of a size to support about six eggs. When it is desired to cook the eggs hard, three teaspoonfuls of water are placed in the well and with a medium heat this water will be all converted into steam in about eight minutes, starting with cold water, and the eggs will then be cooked hard.

For medium soft cooked eggs, two teaspoonfuls of water are used, and for soft eggs, only one teaspoonful is used. The steam commences to generate practically as soon as the heat is applied, and about five minutes later two teaspoonfuls of water will be fully converted into steam and eggs are cooked medium soft, or for one teaspoonful of water only about three minutes is required. In each case the whistle clearly indicates, by ceasing to signal, that the water is all converted into steam and that the eggs are cooked to the desired hardness.

Having described my invention, I claim:

1. An egg cooker comprising a substantially frusto-conical base adapted to be mounted over a flame, a well within its upper edge portion for the reception of water, a platform, for supporting eggs and having a central opening for seating the platform upon the walls of said base adjacent its upper edge, and a cover for enclosing the eggs mounted on the platform.

2. An egg cooker comprising a substantially frusto-conical base including a well for the reception of water, in the upper portion of the base, a substantially annular ring like platform removably mounted on the base adjacent its upper edge and adapted to support eggs, and a cover removably mounted on the platform for enclosing the eggs, said platform including a bead on its outer periphery within which the cover is confined, a raised rib inwardly of said bead, and an upstanding flange on its inner periphery adapted to seat on the base, the eggs being confined between said rib and flange.

3. An egg cooker comprising a water receptacle, a substantially annular ring like platform removably mounted on said water receptacle and encircling the same, said platform being adapted to support eggs and including spaced concentric raised portions between which the eggs are confined, and a cover removably mounted on the platform for enclosing the eggs.

4. An egg cooker comprising a receptacle for water, adapted to be positioned over a source of heat, a substantially horizontal platform positioned adjacent the upper end of the receptacle extending therearound and projecting laterally outwardly therefrom a distance to support a plurality of eggs outwardly of the receptacle, a cover extending over the platform removably supported thereon adjacent the outer edges thereof for enclosing the eggs, said receptacle and platform being formed with an opening for admitting steam generated from water in the receptacle to below the cover and above the platform for surrounding the eggs.

5. In a construction as defined in claim 4, said platform being imperforate over that portion projecting outwardly of the receptacle, and the platform connecting with the receptacle against escape of steam at its connection therewith.

6. In a construction as defined in claim 4, said platform being exposed on its under side for free circulation of outside air to the lower side of the platform.

7. An egg cooker comprising a water receptacle provided with a base arranged and adapted to support the receptacle on the upper surface of a stove elevated above said surface, the upper end of said receptacle being formed with an opening to permit steam from the water to escape therefrom, a platform extending laterally around the receptacle adjacent the upper end thereof a distance to support an annular row of eggs thereon a generally bell-shaped cover extending over the platform and supported thereon adjacent the outer edges of the platform for enclosing a row of eggs supported on the platform.

8. An egg cooker comprising a receptacle for water having generally cylindrical side walls and formed with an opening at its upper end, means for supporting an annular horizontally disposed row of eggs around said opening outwardly therefrom, a cover adapted to enclose the row of eggs adapted to be supported on said means and means for positioning the eggs on said first mentioned means against substantial accidental rolling from a position in an annular row.

9. In a construction as defined in claim 6, said first mentioned means comprising an annular, horizontal platform connecting with said receptacle at its inner edges.

10. In a construction as defined in claim 6, said first mentioned means comprising an annular flat, generally horizontally disposed platform connecting with said receptacle at its inner edges and slightly dished downwardly from said inner edges whereby eggs therein will tend to roll toward the outer edges of the platform, and said last mentioned means comprising an annular upstanding rib adjacent the outer edges of the platform.

11. In a construction as defined in claim 6, said first mentioned means comprising an annular, horizontal platform formed integral with and extending laterally from the upper end of the receptacle.

12. An egg cooker comprising a hollow base open at its lower end and having lateral side walls extending upwardly therefrom, a receptacle for water having side walls, a bottom and formed with an opening at its upper end, means supporting said receptacle within said base in a position with the side walls of the receptacle spaced from the side walls of the base, a horizontally disposed platform supported on said base spaced above the lower end thereof and extending laterally outwardly relative to the side walls of the receptacle and side walls of the base, said platform being adapted to support a plurality of eggs thereon, and, a cover removably supported on said platform for enclosing eggs supported thereon.

ANN G. JENNINGS,
*Administratrix of the Estate of Robert J. Jennings, Deceased.*